UNITED STATES PATENT OFFICE.

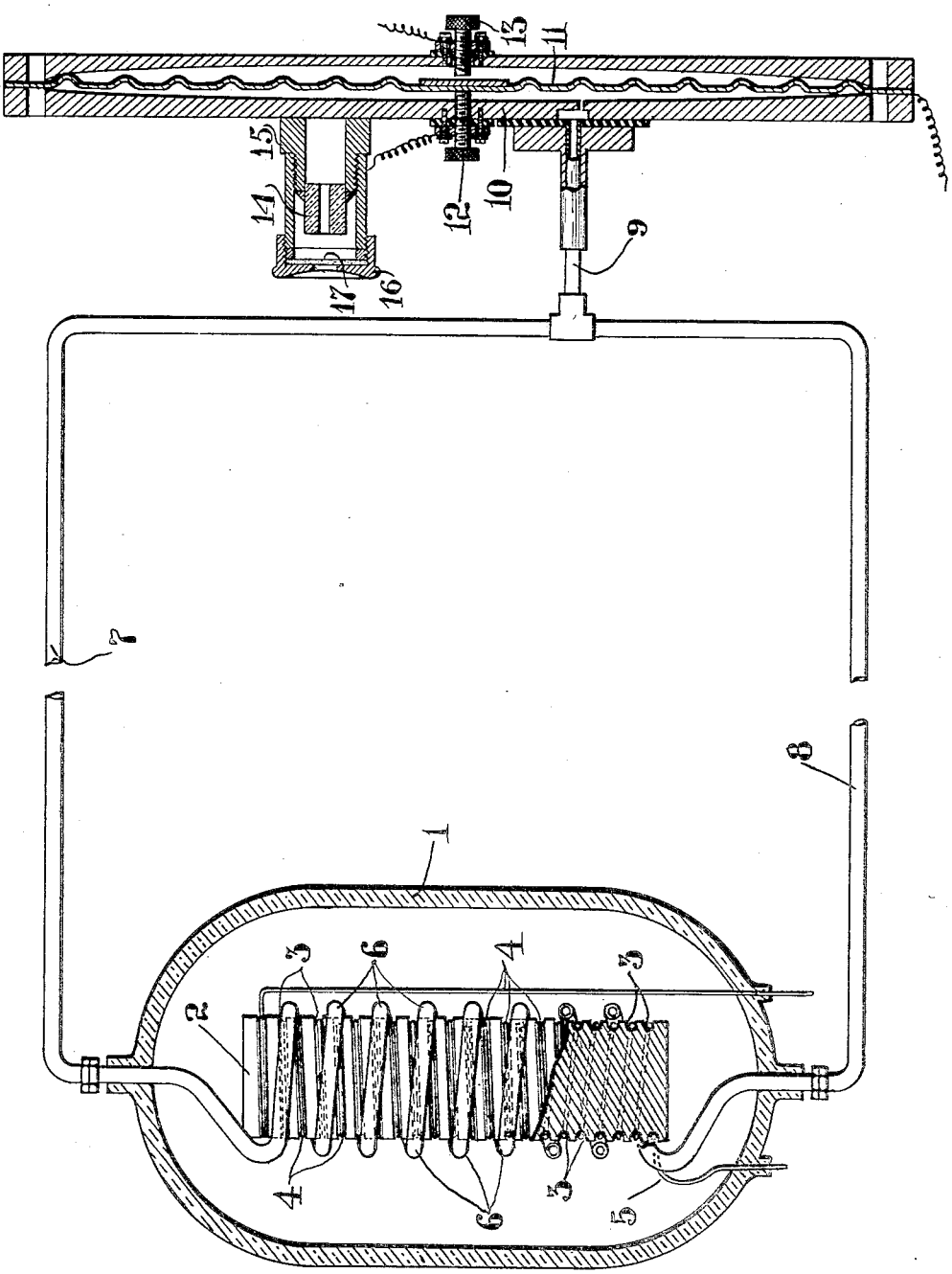

JAMES G. NOLEN, OF NEW YORK, N. Y., ASSIGNOR, BY MESNE ASSIGNMENTS, TO AUTOMATIC FIRE PROTECTION COMPANY, OF NEW YORK, N. Y., A CORPORATION OF MAINE.

SUPERVISORY ALARM SYSTEM.

1,120,623.  Specification of Letters Patent.  Patented Dec. 8, 1914.

Application filed July 23, 1909. Serial No. 509,105.

*To all whom it may concern:*

Be it known that I, JAMES G. NOLEN, a citizen of the United States, residing at New York, in the county of New York and State of New York, have invented a certain new and useful Supervisory Alarm System, of which the following is a specification.

My invention relates to improvements in supervisory alarm systems, such as are employed for indicating sudden and excessive rise in temperature, and particularly to electro-pneumatic systems of the class referred to. Such systems comprise piping of small bore laid through the space to be protected or supervised, and connected to a pressure-actuated alarm initiating device arranged to be actuated by expansion of air in the piping caused by sudden rise of temperature. It is extremely important to be able to test these pipe lines, both initially and from time to time, to determine whether they have, or retain, the proper degree of sensitiveness, and the best test is afforded by applying to a standard length of the detector tubing a definite amount of heat under conditions such as substantially preclude material loss of heat by radiation, and observing whether the alarm-initiating device is actuated as a result of such application of heat.

My invention consists in such a system comprising testing means consisting of a standard length of detector tubing, connected to the main detector-loop, or a main detector loop, of the system, and having associated with it heating means, preferably electrical resistance means, whereby heat may be applied by an electric current; such standard length of detector tubing and the electric resistance being inclosed within a sealed and exhausted chamber, whereby protection is afforded from the action of air, moisture, dust, etc., and whereby radiation of heat is substantially obviated.

I will now proceed to describe my invention with reference to the accompanying drawing, which shows more or less diagrammatically and partly in section and partly in elevation, a system such as described, comprising a testing device such as hereinbefore referred to.

In the said drawing, 1 designates a hermetically sealed tube, preferably of glass or like material, constituting the inclosure above referred to of the testing device; and 2 designates a core or support for the electrical resistance and for the tubing of the testing device.

3 designates the electrical resistance, shown in this case as resistance wire wound about the support 2 and preferably embedded in a groove therein, and provided with leading-in wires 4 and 5 passing through the walls of chamber 1 and sealed therein, the external portion of these leading-in wires constituting electrical terminals for the resistance coils.

6 designates a standard length of detector tubing located within chamber 1 in effective heating proximity to the resistance coil 3 and preferably wound about the support 2; the ends of this pipe projecting through the walls of chamber 1 and preferably sealed therein or otherwise adjusted to the said walls so as to form a tight joint therewith. The projecting ends of this pipe coil 6 are secured to the ends of detector tubes 7 and 8 of the supervisory system, the pipe coil 6, and these pipes 7 and 8, together constituting the detector loop of the system. This loop is connected, by a connection 9, to a diaphragm chamber 10 within which is a diaphragm 11 corrugated for the sake of flexibility. Suitable contact means are provided in connection with this diaphragm. I have indicated for the purpose, contact screws 12 and 13. The diaphragm chamber, which is in electric connection with the diaphragm itself, constitutes a further electric terminal.

The diaphragm contact devices such as herein illustrated, are customarily provided with some form of leakage device permitting a certain small leakage of air from the system without the sending of an alarm; the purpose being that expansion of air in the detector tubing due to slow rise in temperature, such as may be occasioned by climatic changes, the operation of a heating plant, etc., shall not cause the sending of an alarm, but that more rapid expansion of the air in the detector loop, due to more rapid rise in temperature, such as may be caused by a fire within the region protected by the detector loop, shall cause the sending of an alarm. I have indicated the diaphragm contact device as provided with one such leakage device, the particular device illustrated being that described and claimed in my companion application, Sr. No. 509,103, filed July 23, 1909 and comprising a short glass tube 14, of very fine bore, set into a cup 15, and normally covered over by a perforate protecting cap 16, there being underneath this cap, a layer of porous material 17 (cloth or the like) to exclude dust. Because of the provision of this leakage device, rise of temperature of the air in the coil 6, due to less than the predetermined strength of current, will not cause operation of the diaphragm contact device to such extent as to send in an alarm no matter how prolonged may be the passage of this current; but the passage of a current above such predetermined minimum through the resistance coils will result in a more rapid expansion of air in the detector loop, and so in the sending of an alarm; the diaphragm 11 being pressed to the right, that is to say, away from contact screw 12, and into contact with screw 13. Upon cessation of flow of current, or dropping of such current below the predetermined minimum, the pipe coil 6 cools off somewhat, the air therein contracts somewhat, and the diaphragm 11 breaks contact with screw 13 and, eventually, makes contact with screw 12.

The chamber 1 is preferably an exhausted chamber, the great advantage of employing an exhausted chamber being, that the tube and the air within it, heat up much more rapidly than if this tube were surrounded by air or other gas at or about atmospheric pressure, so that for this reason the device is much more sensitive; likewise there is less radiation of heat from the device when the chamber 1 is exhausted.

What I claim is:—

1. In combination, fluid-pressure-actuated means, a long conduit connected thereto and containing an expansible elastic fluid, and testing means comprising an electric resistance heating device associated in heating relation with a definite and constant portion of such conduit, such heating means adapted to impart heat to the same portion and length of such conduit, and at the same rate, at all times.

2. In combination, fluid-pressure-actuated means, a length of detector tubing connected thereto and containing an expansible elastic fluid, a chamber inclosing a portion of such detector tubing and means for heating the portion of the tubing inclosed in such chamber.

3. In combination, fluid-pressure-actuated means, and an air conduit connected thereto and adapted to be exposed to heat and containing an expansible elastic fluid, and electric resistance means associated with a portion of such conduit and arranged to heat such portion locally.

4. In combination, fluid-pressure-actuated means, and detector tubing connected thereto and comprising testing means itself comprising a length of tubing, and heating means associated therewith and arranged to heat the same locally, and a closed chamber inclosing such length of tubing and associated heating means, both portions of such tubing containing expansible elastic fluid.

5. In combination, fluid-pressure-actuated means, and detector tubing connected thereto and comprising testing means itself comprising a length of tubing, and heating means associated therewith and arranged to heat the same locally, and a closed exhausted chamber inclosing such length of tubing and associated heating means, both portions of such tubing containing expansible elastic fluid.

6. In combination, fluid-pressure-actuated means and detector tubing connected thereto and comprising testing means comprising a length of tubing coiled about a support, and an electric resistance coil mounted upon the same support.

7. In combination, fluid-pressure-actuated means and detector tubing connected thereto and comprising testing means comprising a length of tubing coiled about a support, and an electric resistance coil mounted upon the same support, and a chamber inclosing such support, electric resistance and the coiled tube.

8. In combination, fluid-pressure-actuated means and detector tubing connected thereto and comprising testing means comprising a length of tubing coiled about a support, and an electric resistance coil mounted upon the same support, and an exhausted chamber inclosing such support, electric resistance and the coiled tube.

In testimony whereof I affix my signature in the presence of two witnesses.

JAMES G. NOLEN.

Witnesses:
H. M. MARBLE,
FRANK E. RAFFMAN.